Nov. 10, 1936.  P. CIBIE  2,060,279
SELF ACTING CONNECTING DEVICE FOR THE STARTING OF MOTORS
Filed March 6, 1935
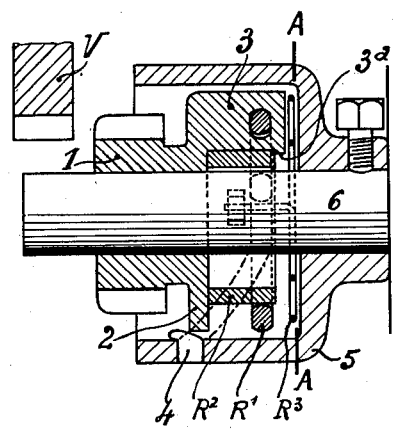
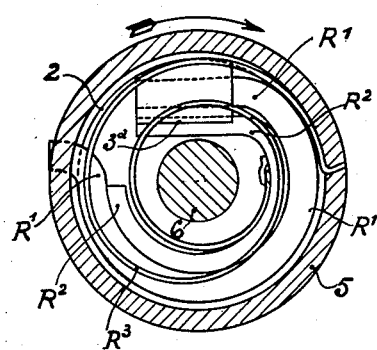
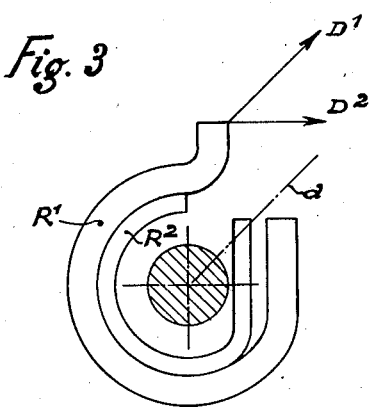
INVENTOR
PIERRE CIBIE'
BY
Richards & Geier
ATTORNEYS Patented Nov. 10, 1936

2,060,279

UNITED STATES PATENT OFFICE 2,060,279

SELF-ACTING CONNECTING DEVICE FOR THE STARTING OF MOTORS

Pierre Cibié, Paris, France

Application March 6, 1935, Serial No. 9,575
In France December 19, 1934

3 Claims. (Cl. 74—9)

This invention relates to improvements in connecting devices placed between the starter and the flywheel for starting motors of the type which comprise a portion of flat spring coil arranged in a plane normal to the axis of the starter, one end of said spring being integral with the pinion which is designed to operate the toothed motor flywheel, and its other end being engaged in the generally helical groove of a cage integral with the starter shaft.

Said spring which will be supposed similar, in front elevation, to the spring $R^1$ shown in Fig. 3 of the appended drawing ensures two functions.

1. Owing to its elasticity in the direction $D^1$ in parallel with the longitudinal axis $d$ of the pinion and of the starter shaft it softens the engagement of the pinion with the flywheel teeth.

2. It deadens the shock at the moment when the pinion being at the end of its run begins to move the flywheel owing to its elasticity in a direction $D^2$ perpendicular to the former.

This invention has firstly for its object to substitute to said spring two concentric springs which allow of adjusting, independently from one another, the flexibility of the spring system in the axial direction $D^1$ and the flexibility in the transverse direction $D^2$.

It is well known on the other hand that in order to maintain the pinion backwards in the inoperative position there is frequently made use of a spring placed at the end of the shaft, between said pinion and an abutment fixed upon said shaft.

A further object consists in replacing said outer spring by a spring secured on one part to the cage and on the other part to the back of the pinion.

Said device allows of dispensing with the abutment at the end of the shaft, thus reducing the space required by the apparatus.

The appended drawing shows by way of example a mode of construction of an improved device according to the present invention.

Fig. 1 is a longitudinal sectional view of the pinion and its fittings.

Fig. 2 is a transverse section drawn along the line AA, Fig. 1.

Fig. 3 illustrates the two main springs, separately.

As will be seen in the drawing, 1 is the pinion designed to engage the teeth of the flywheel V. Said pinion is integral with a back plate 2 which carries a boss 3 in which one end of the spring $R^1$ is secured, the other end of said spring being bent so as to form a nose that engages the groove 4 in cage 5, which is secured upon the starter shaft 6. The groove being located in front of the plane of the figure has been shown in interrupted lines in the drawing.

A second spring $R^2$ one end of which is anchored under the boss 3 behind a lug $3^a$ while its other end rests freely against the spring $R^1$ is placed inside the latter.

At the moment when the pinion engages the teeth provided upon the flywheel, the spring $R^1$ only comes into operation because it can slide upon the spring $R^2$ in the direction $D^1$. The spring $R^1$ has sufficient elasticity to ensure said engagement in good conditions.

At the moment when the flywheel is drawn along by the pinion when the bottom of the groove 4 draws the nose formed at the end of the spring and also moves the pinion rotatively the spring $R^1$ operates in the direction $D^2$. Its operation in that direction is increased by that of the spring $R^2$.

The spring $R^2$ is constructed in such a manner that the force which it transmits, added to that of $R^1$, without exceeding the elastic limit of each one of said springs is sufficient to draw the motor.

$R^3$ is the return spring for the pinion. It is connected in any suitable manner on the one part to the cage and on the other part to the plate 2, or to the spring $R^2$.

Said spring $R^3$ acts to rotate the pinion in the necessary direction to bring it in its inoperative position owing to the reaction of the groove 4 upon the end of the spring $R^1$, and consequently maintains the device in its inoperative position.

What I claim and desire to secure by Letters Patent of the United States is:

1. A connecting device placed between a starter having a shaft and a toothed flywheel for starting a motor, which comprises; a pinion sliding upon the starter shaft, a cage secured upon said shaft and surrounding said pinion when in its inoperative position, a length of flat spring coil connected with said pinion at one end, its other end being engaged like a nose in a groove provided in the cage to cause the said nose to advance axially and then draw it along rotatively for the purpose set forth; and a second spring composed also of a length of flat spring coil placed concentrically inside the first and in slidable contact with the latter at least over a portion of its length, one of its ends being connected with the pinion while the other bears freely against the inner face of the first spring.

2. A connecting device placed between a starter having a shaft and a toothed flywheel for starting a motor, which comprises; a pinion sliding upon the starter shaft, a cage secured upon said shaft and surrounding said pinion when in its inoperative position, a length of flat spring coil connected with said pinion at one end, its other end being engaged like a nose in a groove provided in the cage to cause the said nose to advance axially and then draw it along rotatively for the purpose set forth; a second spring composed also of a length of flat spring coil placed concentrically inside the first and in slidable contact with the latter at least over a portion of its length, one of its ends being connected with the pinion while the other bears freely against the inner face of the first spring, and a third spring designed to maintain the pinion in its inoperative position.

3. A connecting device placed between a starter having a shaft and a toothed flywheel for starting a motor, which comprises: a pinion sliding upon the starter shaft, a cage secured upon said shaft and surrounding said pinion when in its inoperative position, a length of flat spring coil connected with said pinion at one end, its other end being engaged like a nose in a groove provided in the cage to cause the said nose to advance axially and then draw it along rotatively for the purpose set forth; a second spring composed also of a length of flat spring coil placed concentrically inside the first and in slidable contact with the latter at least over a portion of its length, one of its ends being connected with the pinion while the other bears freely against the inner face of the first spring and a third spring placed between the back of the pinion and the bottom of the cage and connected to said pinion on one part and to said cage on the other part so as to cause said pinion to rotate in the direction in which it returns to its inoperative position in cooperation with the cage groove.

PIERRE CIBIÉ.